United States Patent
Neubecker et al.

(10) Patent No.: US 10,453,346 B2
(45) Date of Patent: Oct. 22, 2019

(54) VEHICLE LIGHT CONTROL

(71) Applicant: Ford Global Technologies, LLC, Dearborn, MI (US)

(72) Inventors: Cynthia M. Neubecker, Westland, MI (US); Somak Datta Gupta, Novi, MI (US); Brad Alan Ignaczak, Canton, MI (US); Pramita Mitra, West Bloomfield, MI (US); Jayanthi Rao, West Bloomfield, MI (US); Perry Robinson MacNeille, Lathrup Village, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 56 days.

(21) Appl. No.: 15/697,649

(22) Filed: Sep. 7, 2017

(65) Prior Publication Data
US 2019/0073909 A1   Mar. 7, 2019

(51) Int. Cl.
| G08G 1/00 | (2006.01) |
| B60Q 1/14 | (2006.01) |
| B60Q 1/34 | (2006.01) |
| B60Q 1/44 | (2006.01) |
| B60Q 1/30 | (2006.01) |

(52) U.S. Cl.
CPC .............. *G08G 1/22* (2013.01); *B60Q 1/143* (2013.01); *B60Q 1/30* (2013.01); *B60Q 1/346* (2013.01); *B60Q 1/44* (2013.01); *B60Q 2300/322* (2013.01); *B60Q 2300/336* (2013.01); *B60Q 2300/41* (2013.01); *B60Q 2300/43* (2013.01); *B60Q 2300/47* (2013.01); *B60Q 2900/30* (2013.01)

(58) Field of Classification Search
CPC ....................................................... G08G 1/22
See application file for complete search history.

(56) References Cited

U.S. PATENT DOCUMENTS

| 6,356,189 B1 * | 3/2002 | Fujimaki ................ G08G 1/162 340/465 |
| 7,525,417 B1 * | 4/2009 | Grigsby ................... B60Q 1/38 340/468 |
| 9,630,624 B2 | 4/2017 | Raghu |
| 2006/0225329 A1 | 10/2006 | Morrow |
| 2007/0291130 A1 | 12/2007 | Broggi et al. |
| 2011/0112719 A1 * | 5/2011 | Marumoto ............... G01F 9/02 701/33.4 |
| 2015/0035979 A1 | 2/2015 | Fischer et al. |
| 2017/0186327 A1 * | 6/2017 | Uysal ....................... G08G 1/22 |

(Continued)

FOREIGN PATENT DOCUMENTS

| DE | 102015211117 A1 | 12/2016 |
| JP | 10141963 A * | 5/1998 |
| JP | 2018060448 A * | 4/2018 |

OTHER PUBLICATIONS

English translation JP2018060448.*

*Primary Examiner* — Rami Khatib
(74) *Attorney, Agent, or Firm* — Frank A. MacKenzie; Bejin Bieneman PLC

(57) ABSTRACT

A system including a computer for a vehicle is programmed to identify the vehicle as a lead vehicle in a platoon of three or more vehicles, and to identify one of the vehicles in the platoon as a caboose vehicle. The computer is programmed to deactivate a rear light of the lead vehicle, and to instruct activation of a rear light of the caboose vehicle.

11 Claims, 7 Drawing Sheets

(56) References Cited

U.S. PATENT DOCUMENTS

2017/0217360 A1* 8/2017 Pierfelice ............... B60Q 1/085
2017/0244160 A1* 8/2017 Neubecker ............... H01Q 3/08
2018/0084511 A1* 3/2018 Wu ......................... H04L 67/12
2018/0099606 A1* 4/2018 Dudar .................... B60Q 1/085

* cited by examiner

VEHICLE LIGHT CONTROL

BACKGROUND

One or more computers can be programmed to control a platoon of vehicles on a road. A platoon includes a lead vehicle and following vehicles. The following vehicles follow the lead vehicle which is typically the first vehicle in a line of vehicles in the platoon, i.e., the lead vehicle travels in front of the following vehicles. Platoon vehicles are typically equipped with lights, e.g., exterior vehicle lights such as are known. However, technical infrastructures are lacking with respect to controlling the vehicle lights while moving in a platoon.

DETAILED DESCRIPTION

Introduction

Figure 1:
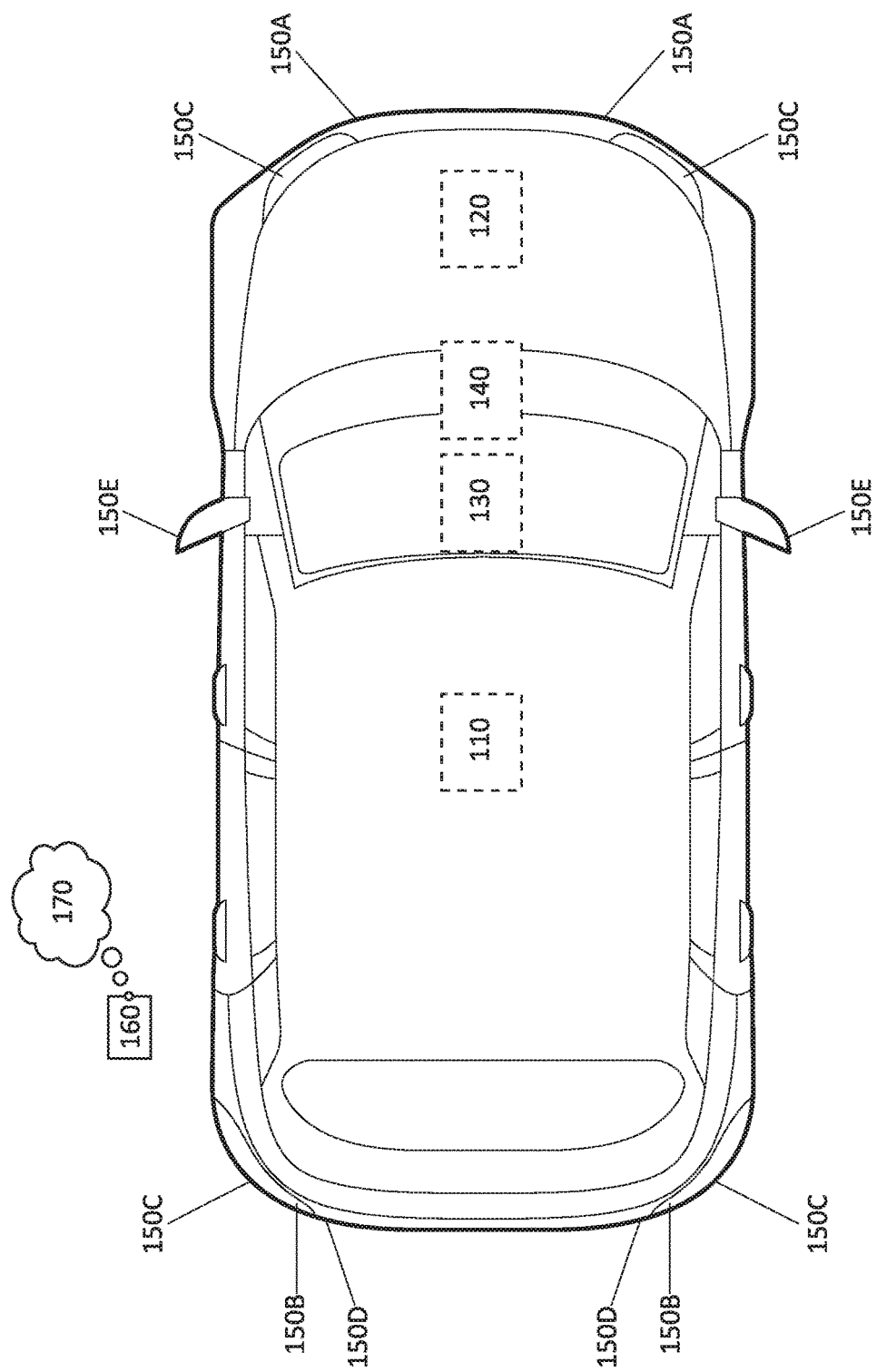
FIG. 1 is a block diagram of an example vehicle system.

Disclosed herein is a system including a computer for a vehicle that is programmed to identify the vehicle as a lead vehicle in a platoon of three or more vehicles, identify one of the vehicles in the platoon as a caboose vehicle, deactivate a rear light of the lead vehicle, and instruct activation of a rear light of the caboose vehicle.

The computer may be further programmed to identify a middle vehicle from the vehicles in the platoon, and deactivate a head light and a tail light of the middle vehicle.

The computer may be further programmed to deactivate a brake light and a turn signal of the middle vehicle.

The system may further include a second computer of the middle vehicle that is programmed to receive an instruction from the lead vehicle, identify one more lights of the middle vehicle based on the received instruction, and actuate the identified lights of the middle vehicle.

The computer may be further programmed to identify a plurality of middle vehicles, and determine respective light control instructions for each of the plurality of middle vehicles based on a curvature of a road section from the lead vehicle to the caboose vehicle.

The computer may be further programmed to determine the respective light instruction for each of the plurality of middle vehicles based on a distance of the respective middle vehicle to at least one of a next front vehicle and a next rear vehicle in the same lane.

The vehicles of the platoon may be in a first lane and a second vehicle may be in a second lane, and the computer may be further programmed to determine the light control instruction for each of the middle vehicles based on a distance of the respective middle vehicle to the second vehicle.

The computer may be further programmed to actuate a head light of the lead vehicle to turn off upon determining that the lead vehicle is stopped at an intersection.

The computer may be further programmed to transmit at least one of a number of the platoon of three or more vehicles and a distance between the lead vehicle and the caboose vehicle, to a second vehicle approaching the lead vehicle in an opposite direction.

The computer may be further programmed to deactivate a head light of the caboose vehicle.

The computer may be further programmed to instruct activation of the rear light of the caboose vehicle by actuating at least one of a turn signal and a brake light of the caboose vehicle based on data received from the lead vehicle.

Further disclosed herein is a method including identifying a vehicle as a lead vehicle in a platoon of three or more vehicles, identifying one of the vehicles in the platoon as a caboose vehicle, deactivating a rear light of the lead vehicle, and instructing activation of a rear light of the caboose vehicle.

The method may further include identifying a middle vehicle from the vehicles in the platoon, and deactivating a head light and a tail light of the middle vehicle.

The method may further include deactivating a brake light and a turn signal of the middle vehicle.

The method may further include receiving an instruction from the lead vehicle, identifying one more lights of the middle vehicle based on the received instruction, and actuating the identified lights of the middle vehicle.

The method may further include identifying a plurality of middle vehicles, and determining respective light control instructions for each of the plurality of middle vehicles based on a curvature of a road section from the lead vehicle to the caboose vehicle.

Determining the respective light instruction for each of the plurality of middle vehicles may be based on a distance of the respective middle vehicle to at least one of a next front vehicle and a next rear vehicle in the same lane.

The method may further include actuating a head light of the lead vehicle to turn off upon determining that the lead vehicle is stopped at an intersection.

The method may further include transmitting at least one of a number of the platoon of three or more vehicles and a distance between the lead vehicle and the caboose vehicle, to a second vehicle approaching the lead vehicle in an opposite direction.

The method may further include deactivating a head light of the caboose vehicle.

Further disclosed is a computing device programmed to execute the any of the above method steps.

Yet further disclosed is a computer program product, comprising a computer readable medium storing instructions executable by a computer processor, to execute any of the above method steps.

Exemplary System Elements

FIG. 1 illustrates a vehicle 100. The vehicle 100 may be powered in a variety of ways, e.g., with an electric motor and/or internal combustion engine. The vehicle 100 is a land vehicle such as a car, truck, etc. Additionally or alternatively, the vehicle 100 may include a bike, e.g., a motorcycle. A vehicle 100 may include a computer 110, actuator(s) 120, sensor(s) 130, and HMI 140.

The computer 110 includes a processor and a memory such as are known. The memory includes one or more forms of computer-readable media, and stores instructions executable by the computer 110 for performing various operations, including as disclosed herein.

The computer 110 may operate the respective vehicle 100 in an autonomous, a semi-autonomous mode, or a non-autonomous (or manual) mode. For purposes of this disclosure, an autonomous mode is defined as one in which each of vehicle 100 propulsion, braking, and steering are controlled by the computer 110; in a semi-autonomous mode the computer 110 controls one or two of vehicles 100 propulsion, braking, and steering; in a non-autonomous mode a human operator controls each of vehicle 100 propulsion, braking, and steering.

The computer 110 may include programming to operate one or more of land vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations. Additionally, the computer 110 may be programmed to determine whether and when a human operator is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle and/or receive messages from the various devices, e.g., an actuator 120, an HMI 140, etc. Alternatively or additionally, in cases where the computer 110 actually comprises a plurality of devices, the vehicle 100 communication network may be used for communications between devices represented as the computer 110 in this disclosure. Further, as mentioned below, various controllers and/or sensors may provide data to the computer 110 via the vehicle communication network.

In addition, the computer 110 may be configured for communicating through a vehicle-to-vehicle (V-to-V) wireless communication interface with other vehicles 100, e.g., via a vehicle-to-vehicle communication network 170. The V-to-V communication network 170 represents one or more mechanisms by which the computers 110 of vehicles 100 may communicate with other vehicles 100, and may be one or more of wireless communication mechanisms, including any desired combination of wireless (e.g., cellular, wireless, satellite, microwave and radio frequency) communication mechanisms and any desired network topology (or topologies when a plurality of communication mechanisms are utilized). Exemplary V-to-V communication networks include cellular, Bluetooth, IEEE 802.11, dedicated short range communications (DSRC), and/or wide area networks (WAN), including the Internet, providing data communication services. Additionally or alternatively, the vehicle 100 computer 110 may be programmed to communicate via a vehicle-to-infrastructure (V-to-I) communication network 170 with a remote computer 160, e.g., a cloud computer. The remote computer 160 may be programmed to receive information and/or transmit instructions to the vehicle(s) 100.

The vehicle 100 actuators 120 are implemented via circuits, chips, or other electronic and or mechanical components that can actuate various vehicle subsystems in accordance with appropriate control messages, e.g., as might be provided via the vehicle 100 network to electronic control units (ECUs) or the like that activate actuators 120, e.g., that can control braking, acceleration, and steering of the vehicles 100.

The sensors 130 may include a variety of devices known to provide data to the computer 110. For example, the sensors 130 may include Light Detection And Ranging (LIDAR) sensor(s) 130 disposed on a top of the vehicle 100 that provide relative locations, sizes, and shapes of other vehicles 100 surrounding the vehicle 100, including other vehicles 100 travelling next to or behind the vehicle 100 (see FIGS. 2-4). As another example, one or more radar sensors 130 fixed to vehicle 100 bumpers may provide locations of other vehicles 100 travelling in front, side, and/or rear of the vehicle 100, relative to the location of the vehicle 100. The sensors 130 may further alternatively or additionally include camera sensor(s) 130, e.g. front view, side view, etc., providing images from an area surrounding the vehicle 100. For example, the computer 110 may be programmed to receive image data from the camera sensor(s) 130 and to implement image processing techniques to detect lane(s) 210, 220, 230 and other objects such as other vehicles 100.

The computer 110 may be further programmed to determine a current driving lane 210 of the vehicle 100, e.g., based on global positioning system (GPS) coordinates and/or detected lane markings of the lane 210. Based on data received from the sensors 130, the computer 110 may determine a relative distance, speed, etc., of objects such as other vehicles 101 relative to the vehicle 100. As another example, the computer 110 may be programmed to receive data including relative speed, location coordinates, and/or direction of objects such as other vehicles 101 via the wireless communication network.

The HMI 140 may receive input from a human operator during operation of the vehicle 100. Moreover, an HMI 140 may be configured to display, e.g., via visual and/or audio output, information to the user. Thus, an HMI 140 may be located in the passenger compartment of the vehicle 100 and may include one or more mechanisms for user input. For example, the HMI 140 may include a turn signal switch, other light switches or buttons, a microphone, a touchscreen, etc.

The vehicle 100 includes various exterior light(s) 150. For example, the vehicle 100 may include head light(s) 150A, tail light(s) 150B, turn signal(s) 150C, brake light(s) 150D, side light(s) 150E, etc. The vehicle 100 may include other exterior lights 150 based on vehicle 100 model, size, etc. For example, the vehicle 100 may include park lights 150, fog lights 150, high beam light 150, etc. The computer 110 and/or a vehicle 100 user may activate and/or deactivate an exterior lights 150, e.g., based on an ambient light condition, a weather condition, a road 200 type, etc.

Figure 2:
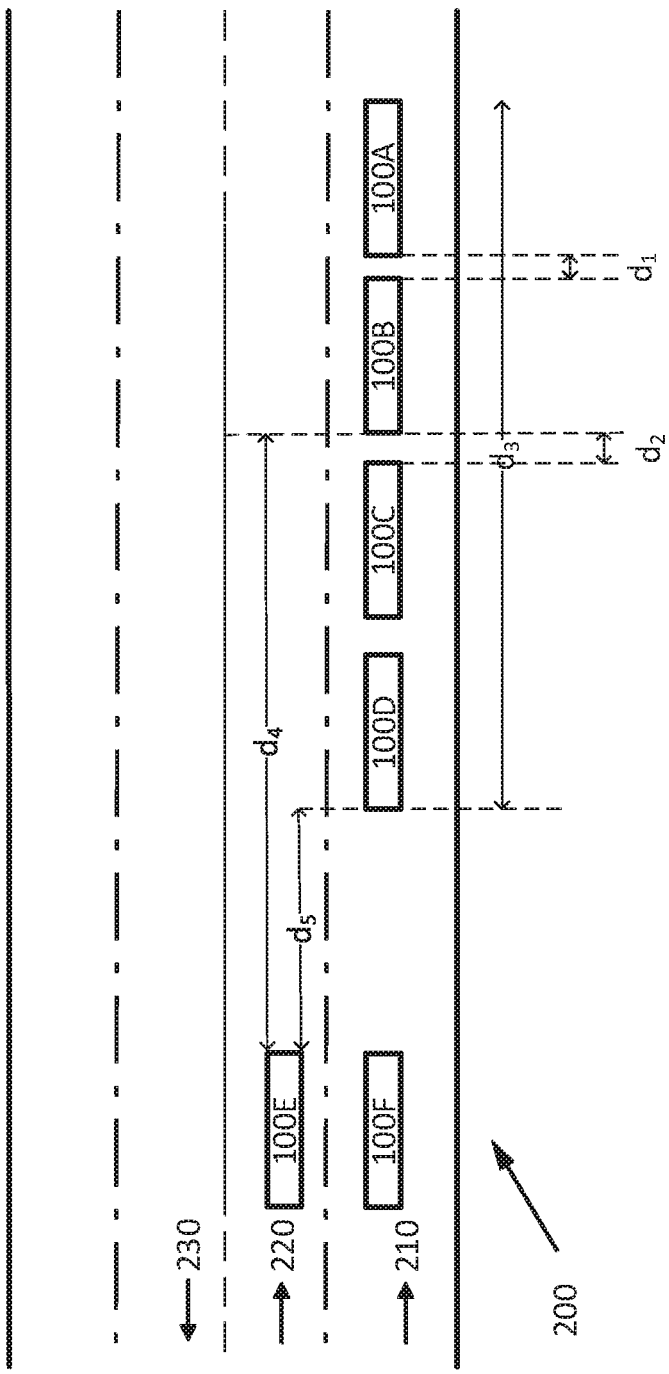
FIG. 2 is an example block diagram showing multiple vehicles of FIG. 1 on a road.

As shown in FIG. 2, the vehicle 100 computer 110 may be programmed to navigate the vehicle 100 in a platoon of three or more vehicles 100. Typically, a platoon of the three or more vehicles 100 drives in a same lane 210 and have a lead vehicle 100A. In one example, the lead vehicle 100A may be driven in a non-autonomous or semi-autonomous mode, while other vehicles 100 in the platoon such as the vehicles 100B, 100C, 100D follow the lead vehicle 100A in an autonomous mode.

A vehicle such as the vehicle 100D that follows all other vehicles 100 in the platoon is herein referred to as a caboose vehicle 100D. Vehicles 100 between the lead vehicle 100A and the caboose vehicle 100D, e.g., the vehicles 100B, 100C, are herein referred to as middle vehicles 100B, 100C. A platoon typically includes a single lead vehicle 100A and a single caboose vehicle 100D, but can include one or more middle vehicles 100B, 100C, etc. Thus, for purposes of illustration and not limitation, two middle vehicles 100B, 100C are generally referred to in the examples herein. The lead vehicle 100A computer 110 may be programmed to transmit data received from the lead vehicle 100A sensors 130 to the middle vehicles 100B, 100C, and/or the caboose vehicle 100D. The computers 110 of the middle vehicles 100B, 100C and the caboose vehicle 100D may be programmed to keep a minimum distance, e.g., distances $d_1$, $d_2$, to a next vehicle 100 immediately in front of the respective middle vehicle 100B, 100C. A distance $d_3$ between a front end of the lead vehicle 100A and a rear end the caboose vehicle 100D is herein referred to as a length of the platoon. The distances such as the distances $d_1$, $d_2$, $d_3$, etc. in this disclosure are defined relative to edges of vehicle 100 bumpers, alternatively, the distances can be relative to any other point in vehicles 100 such as a center point, etc.

A vehicle 100 computer 110 may be programmed to determine that it can form a platoon with other vehicles 100, e.g. that vehicles 100A, 100B, 100C, 100D can move in a platoon, e.g., upon determining that the vehicles 100A, 100B, 100C, 100D drive in a same lane 210 and/or request joining a platoon. There may be further requirements for forming a platoon, e.g., that a distance between any of two adjacent vehicles 100 in the lane 210, e.g., the distance $d_2$ between the vehicles 100A, 100B, is less than a predetermined threshold, e.g., 50 m. Additionally or alternatively, there may be a requirement that a headway time (i.e., the time to travel the distance $d_2$ between the vehicles 100A, 100B) is less than a predetermined time threshold. Thus, the distance $d_2$ between the vehicles 100A, 100B can increase as their speeds increase. Additionally or alternatively, the lead vehicle 100A computer 110 may be programmed to broadcast an invitation to join a platoon, e.g., via the wireless network 170. The platoon invitation in the present context can include an identifier and/or location coordinates of the lead vehicle 100A and other vehicles 100 in the platoon, e.g., middle vehicles 100B, 100C, and/or the caboose vehicle 100D, a speed of vehicles 100 in the platoon, a lane 210 in which the platoon of vehicles 100 drive, a number of vehicles 100 in the platoon, etc.

As discussed above, the vehicle 100 exterior light(s) 150 illuminate an exterior of the vehicle and/or provide information to other vehicles 100, e.g., the brake lights 150D, the turn signals 150c, etc. In a platoon of vehicles 100, it may be advantageous that some of the exterior lights 150 are deactivated and/or synchronized among the vehicles 100 in the platoon. For example, this may reduce light pollution, reduce energy consumption of vehicles 100 in the platoon and/or reduce a visual distraction of other traffic participants such as vehicle 100E, 100F outside the platoon. Thus, a lead vehicle 100A computer 110 may be programmed to identify the vehicle 100A as the lead vehicle in the platoon of the vehicles 100A, 100B, 100C, 100D, and to identify the vehicle 100D in the platoon as a caboose vehicle 100D. The computer 110 can be further programmed to deactivate a rear light 150B of the lead vehicle 100A and to instruct activation of a rear light, e.g., the lights 150B, 150C, 150D, of the caboose vehicle 100D.

The computer 110 may be further programmed to identify middle vehicle(s) 100B, 100C from the vehicles 100 in the platoon, and to deactivate a head light 150A and a tail light 150B of the middle vehicle(s) 100B, 100C. As discussed above, the vehicles 100 in the platoon may communicate with one another, e.g., provide location coordinates, speed, steering wheel angle, yaw angle, etc. to other vehicles 100 in the platoon. Thus, the caboose vehicle 100D computer 110 may navigate the vehicle 100D although the tail lights 150B of the middle vehicle 100C are deactivated.

The computer 110 may be further programmed to instruct activation of a vehicle 100 rear light, e.g., the light 150B, 150C, 150D, of the caboose vehicle 100D, by actuating at least one of a turn signal 150C and a brake light 150D of the caboose vehicle 100D based on data received from the lead vehicle 100A. For example, the lead vehicle 100A computer 110 may be programmed to instruct the caboose vehicle 100D (e.g., by transmitting a light control instruction) to activate its brake light 150D, e.g., upon activation of a lead vehicle 100A brake pedal by a lead vehicle 100A user and/or a deceleration of the lead vehicle 100A caused by, e.g., coasting. A light control instruction in the context of this disclosure is a vehicle-to-vehicle to vehicle message from a first vehicle to a second vehicle wherein the first vehicle instructs the second vehicle concerning control, e.g., activation or deactivation, of at least one second vehicle light. Typically, a light control instruction includes a target vehicle 100 identifier, one or more exterior lights 150 identifiers, e.g., the brake light 150D, and respective command(s) for identified light(s), e.g., activation or deactivation. Additionally or alternatively, a light control instruction may include a target vehicle 100 identifier and a maximum power consumption rate, e.g., "low", as discussed below. The target vehicle 100 means the vehicle 100 which is instructed to execute the received light control instruction. As another example, the computer 110 of the lead vehicle 100A may be programmed to determine a lane change, e.g., from the lane 210 to a lane 220, and instruct the caboose vehicle 100D computer 110 to activate the caboose vehicle 100D turn signal(s) 150C. Thus, advantageously, a vehicle 100E, 100F outside the platoon may detect the activated turn signals and thereby determine that the platoon of the vehicles 100 intend to change lane. Additionally or alternatively, the caboose vehicle 100D computer 110 may be programmed to deactivate a head light 150A of the caboose vehicle 100D.

The computer 110 may be further programmed to deactivate a brake light 150D and a turn signal 150C of the middle vehicle(s) 100B, 100C. In one example, the middle vehicles 100B, 100C receive brake and/or turn signal data from the lead vehicle 100A and/or other vehicles 100 in the platoon. Thus, the middle vehicles 100B, 100C may navigate the vehicles 100B, 100C although the brake and/or turn signal lights 150 of the lead vehicle 100A are deactivated.

As another example, the lead vehicle 100A computer 110 may be programmed to instruct the middle vehicles 100B, 100C to reduce their respective power consumption rate below a predetermined maximum power consumption rate, e.g., "very low", "low", or "medium". Each of the predetermined maximum power consumption rate may be associated with a power consumption rate, e.g., 10 Watt (W), 20 W, 30 W, respectively. The middle vehicles 100B, 100C respective computers 110 may be programmed to activate one or more lights 150 of the respective middle vehicle 100B, 100C such that total consumption of power by the exterior lights 150 does not exceed the instructed maximum power consumption rate, e.g., 10 W. In one example, the middle vehicle 100B, 100C computer 110 may activate the vehicles 100B, 100C side lights 150E only upon receiving the instruction with the "low" power consumption rate.

Additionally or alternatively, the computer 110 may be programmed to determine the respective light instruction (i.e., instruction to activate and/or deactivate lights 150 for each of the middle vehicles 100) based on the distance $d_1$ of the respective middle vehicle, e.g., the vehicle 100B, to at least one of a next front vehicle 100, e.g., the lead vehicle 100A, and a next rear vehicle, e.g., the vehicle 100C in the same lane 210. For example, the computer 110 of the lead vehicle 100A may be programmed to activate the side lights 150E of the middle vehicle 100B when at least one of the distances $d_1$, $d_2$ exceeds a distance threshold, e.g., 15 meters (m). Thus, the vehicle 100B may become more visible for one or more vehicles 100E, 100F outside the platoon. That, advantageously, may result in avoiding a vehicle 100E, 100F changing lanes to a location between the vehicles 100A, 100C. Additionally or alternatively, the computer 110 may be programmed to activate the side lights 150E of every other middle vehicle while deactivating every other vehicle 100 side lights 150E.

Due to a lane 210 curvature, a vehicle 100E, 100F outside the platoon may lack visibility to the lights 150 of the lead vehicle 100A and/or the caboose vehicle 100D. That is, one may say that the lights of the vehicle 100A and/or 100D are occluded with respect to a vehicle 100E and/or 100F. The computer 110 may be programmed to identify multiple middle vehicles 100B, 100C, and to determine respective light control instructions for each of the middle vehicles 100B, 100C based on a curvature of a section of the road from the lead vehicle 100A to the caboose vehicle 100D. For example, the computer 110 may be programmed to determine a radius of the curvature of the lane 210 section between the lead vehicle 100A and the caboose vehicle 100D based on, e.g., map data and location coordinates of the vehicles 100A, 100D. The computer 110 may be programmed to activate, e.g., the side lights 150E of the middle vehicles 100B, 100C, upon determining that the determined radius of the curvature is less than a predetermined threshold, e.g., 250 meters.

Additionally or alternatively, the computer 110 of the lead vehicle 100A may be programmed to actuate the vehicle 100A head lights 150A based on an ambient light intensity, e.g., received from the vehicle 100 light sensors 130. For example, the computer 110 may be programmed to deactivate a high beam light 150 and/or increase an intensity of a low beam light 150 upon determining that an ambient light intensity exceeds a light intensity threshold, e.g., in an urban area. Additionally or alternatively, the computer 110 of the middle vehicles 100B, 100C may be programmed to activate the side lights 150E upon determining that the middle vehicle 100B, 100C crosses an intersection, e.g., to prevent a side impact of the vehicles 100B, 100C.

The computer 110 may be programmed to determine a respective light control instruction for each of the middle vehicles, e.g., the vehicle 100B, based on a distance $d_4$ of the respective middle vehicle 100B to a second vehicle 100E in a second lane 220 different from the platoon lane 210. For example, the computer 110 may be programmed to activate a light 150 such as a side light 150E of the middle vehicle 100B upon determining that the distance $d_4$ of the second vehicle 100E in the adjacent lane 220 to the middle vehicle 100B is less than a distance threshold, e.g., 75 m. Thus, the side lights 150E may be turned off when no second vehicle 100E is near the middle vehicle 100B in an adjacent lane such as the lane 220. This may advantageously reduce a power consumption of the middle vehicle 100B.

Figure 3:
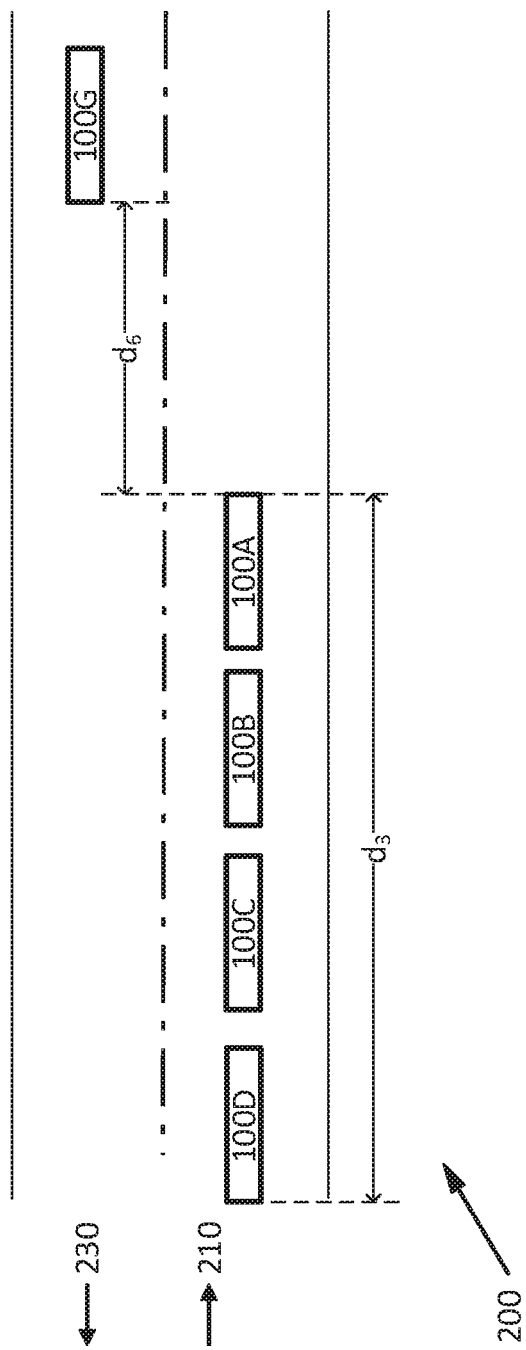
FIG. 3 is another example block diagram showing multiple vehicles in opposite directions.

FIG. 3 shows an example bi-directional road 200 with the lanes 210, 230. A vehicle 100G approaches a platoon of vehicles 100A, 100B, 100C, 100D driving in an opposite direction in the lane 210. In one example, the computer 110 may be programmed to transmit a number of the vehicles 100A, 100B, 100C, 100D and/or the length $d_3$ of the platoon to the second vehicle 100G approaching the lead vehicle 100A in an opposite direction. Thus, advantageously, the second vehicle 100G computer 110 may be programmed to navigate the second vehicle 100G based on the received number of vehicles 100 in the platoon and/or the length $d_3$ of the platoon. For example, the vehicle 100G computer 110 may be programmed to prevent an overtake maneuver of the vehicle 100G until the vehicle 100G has passed the caboose vehicle 100D.

Figure 4:
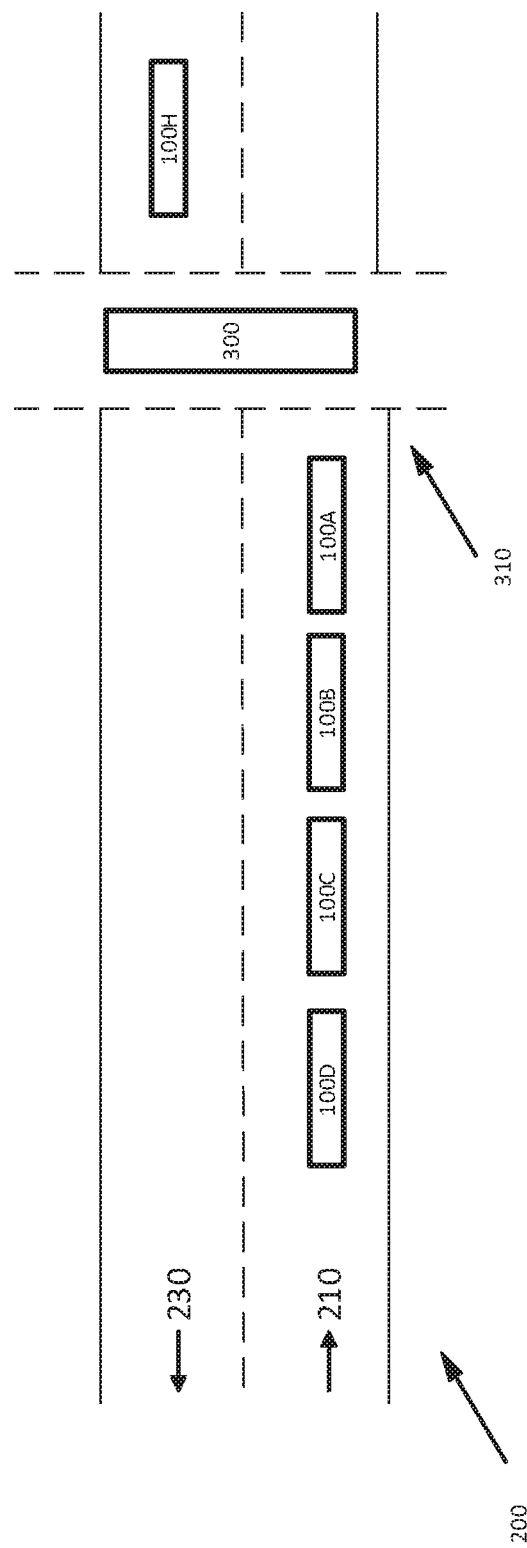
FIG. 4 is an example intersection of a road and a train track.

FIG. 4 shows an example intersection 310 at which the road 200 intersects a train 300 track. The vehicles 100 may stop and wait at the intersection 310. A stoppage at a train intersection 310 may be long and the head lights 150A of the vehicle 100A may disturb a vehicle 100H user and/or the vehicle 100A lights 150A may cause the vehicle 100H user not to recognize the train 300 because of seeing the lights 150A of the vehicle 100A between the train 300 cars passing through the intersection 310. In one example, the computer 110 of the lead vehicle 100A may be programmed to actuate the lead vehicle 100A head light(s) 150A to turn off or dim upon determining that the lead vehicle 100A is stopped at an intersection 310.

Processing

Figure 5A:
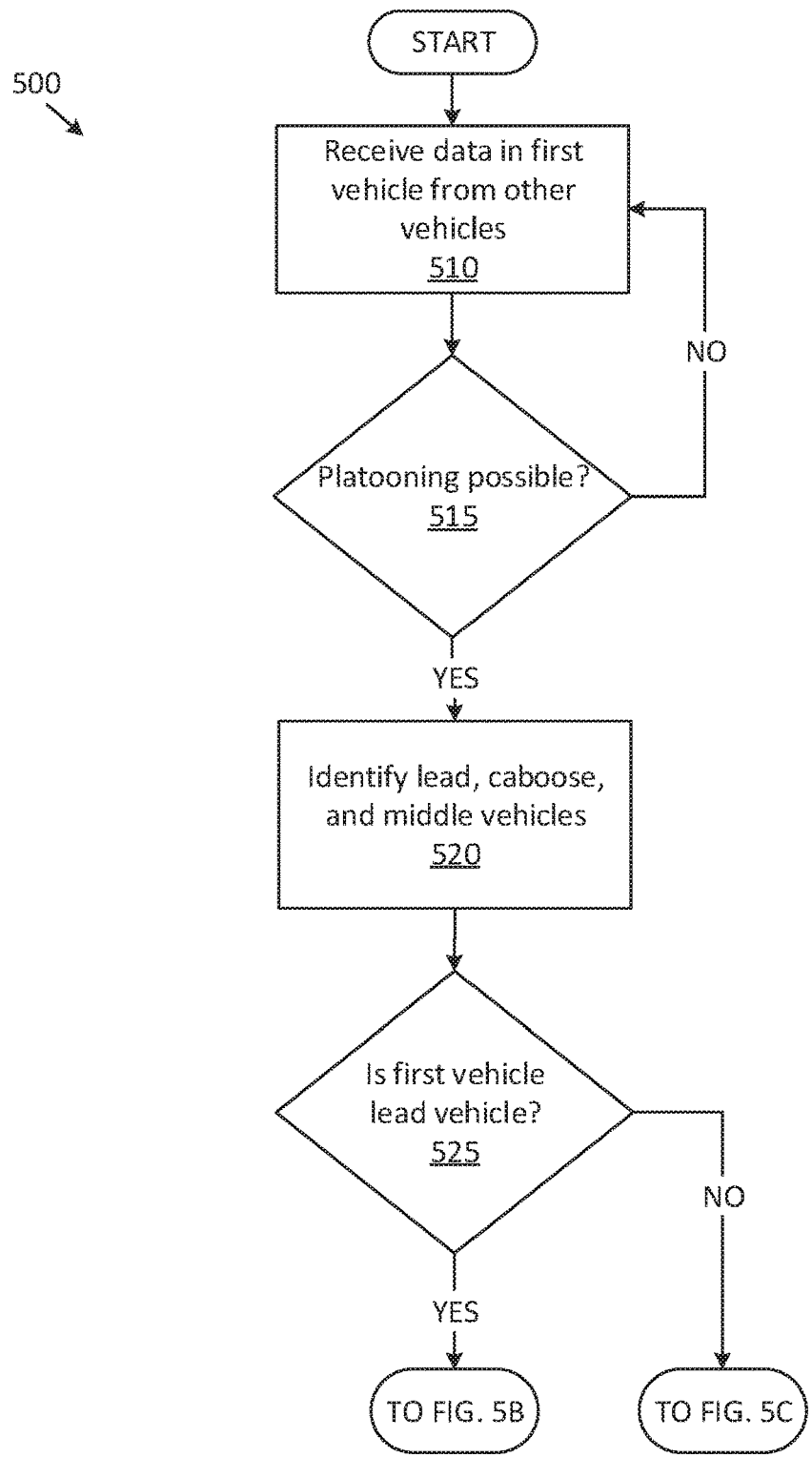
FIGS. 5A-5C are a flowchart of an exemplary process of a vehicle computer for controlling vehicle light(s).
Figure 5B:
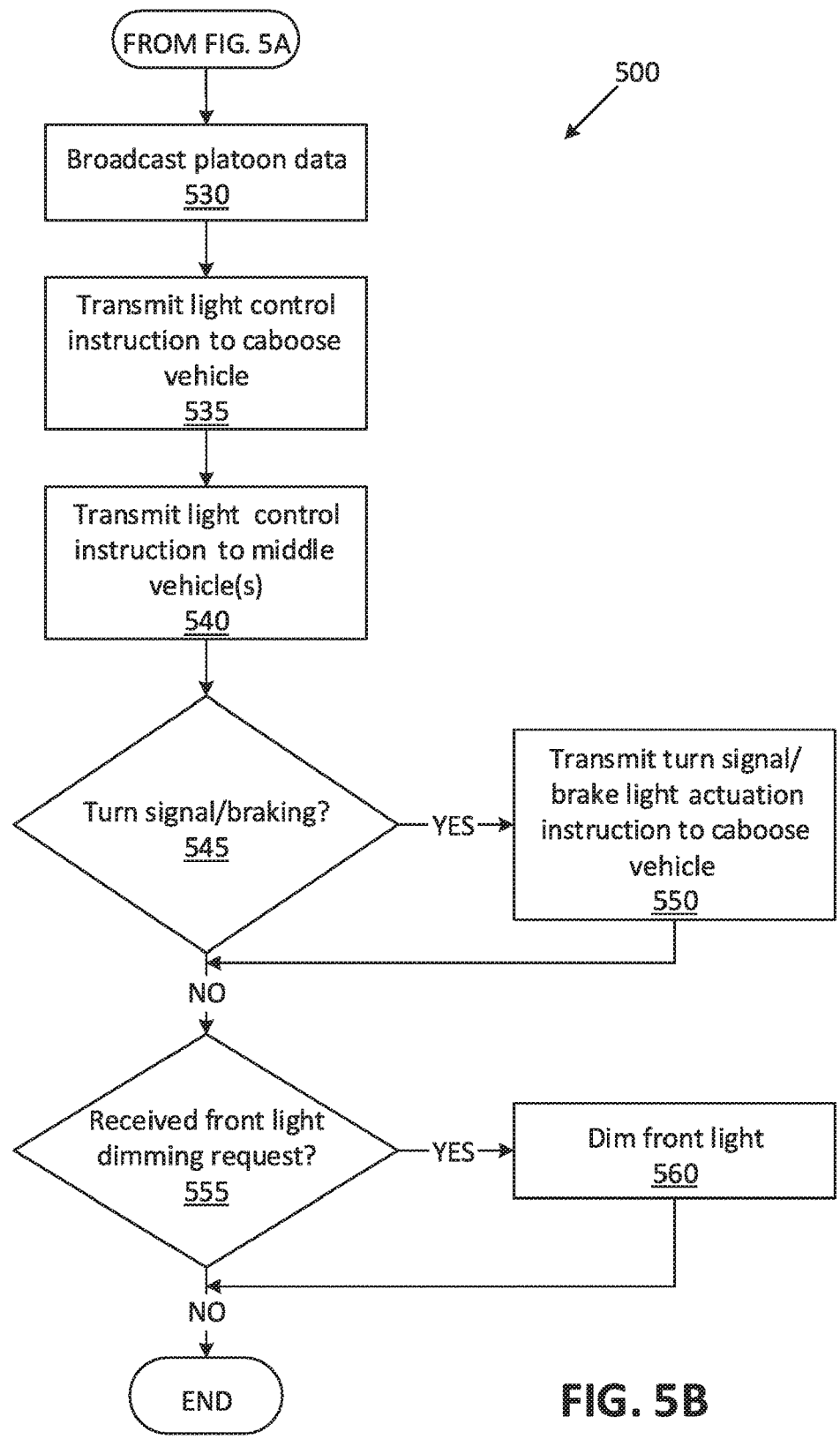
Figure 5C:
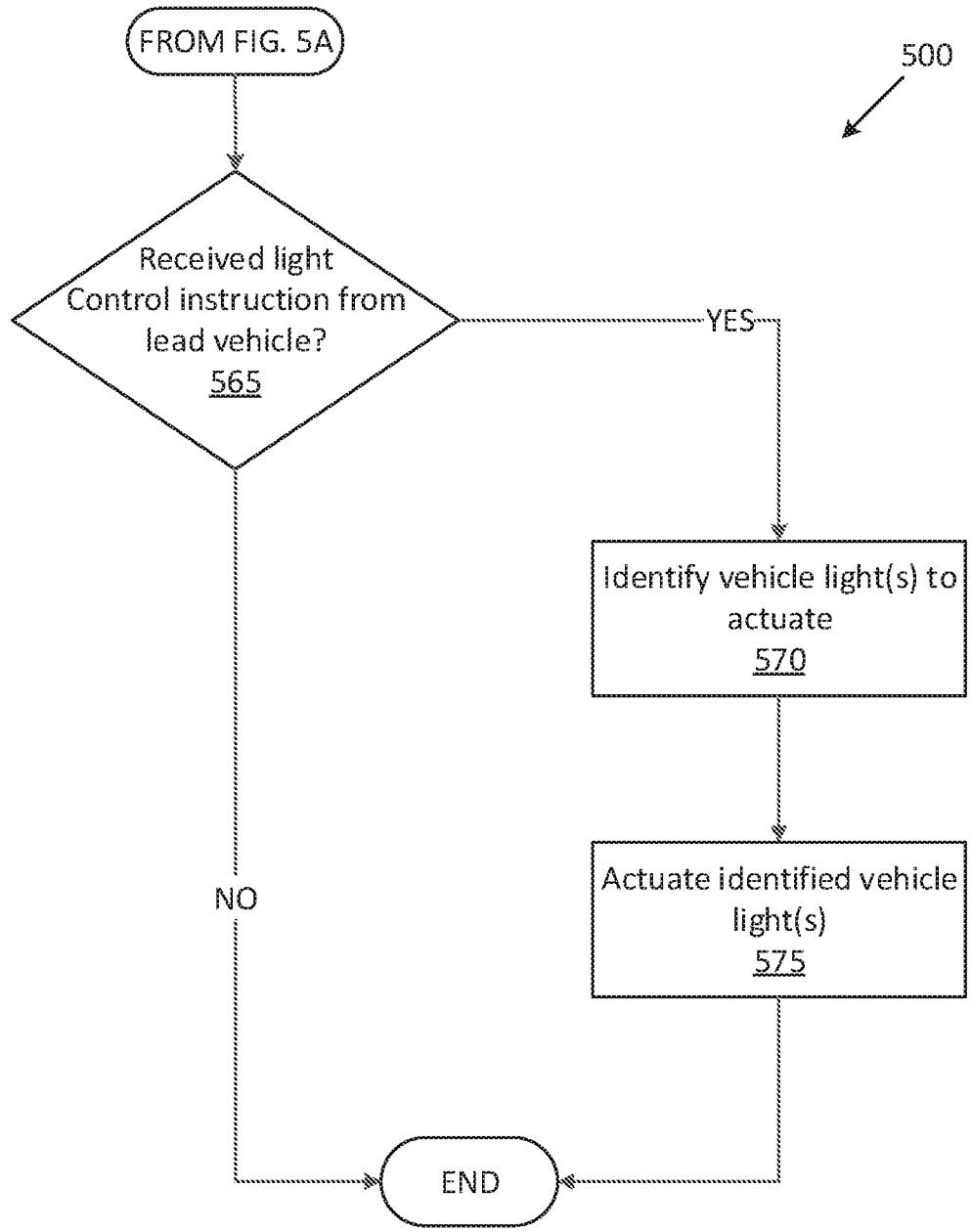

FIGS. 5A-5C is a flowchart of an example process 500 for controlling the vehicle 100 exterior lights 150. For example, any of vehicles 100 computer 110 may be programmed to execute blocks of the process 500.

With reference to FIG. 5A, the process 500 begins in a block 510, in which the computer 110 receives data from other vehicles 100, e.g., via vehicle-to-vehicle communications such as described above. For example, a vehicle 100A computer 110 can receive data from vehicles 100B, 100C, 100D, 100E, etc., including a speed, current lane, and/or whether the other vehicle 100 requests to move in a platoon and/or accepts to be a lead vehicle 100 for a platoon.

Next, in a decision block 515, the computer 110 determines whether the vehicle 100 and one or more of other vehicles 100 can move in a platoon. For example, the computer 110 may be programmed to determine that the vehicles 100A, 100B, 100C, 100D can move in a platoon upon determining that the vehicles 100A, 100B, 100C, 100D drive in a same lane 210, have requested joining a platoon, and/or that a distance between any of two adjacent vehicles 100 in the lane 210, e.g., the distance $d_2$ between the vehicles 100A, 100B, is less than a predetermined threshold, e.g., 50 m. If the computer 110 determines that a platoon is possible, then the process 500 proceeds to a block 520; otherwise the process 500 returns to the block 510.

In the block 520, the computer 110 identifies a lead vehicle 100A, a caboose vehicle 100D, and one or more middle vehicles 100B, 100C, etc.

Next, in a decision block 525, the computer 110 of the vehicle 100 determines whether the vehicle 100 is the lead vehicle. In other words, the computer 110 may be programmed to determine whether the computer 110 is disposed in the lead vehicle 100A. If the computer 110 determines that the vehicle 100 is the lead vehicle, then the process 500 proceeds to a block 530 (see FIG. 5B); otherwise the process 500 proceeds to a decision block 565 (see FIG. 5C).

Turning to FIG. 5B, in the block 530, the computer 110 broadcasts platoon invitation. For example, the computer 110 may broadcast the platoon invitation via the wireless network 170. A platoon invitation can include an identifier and/or location coordinates of the lead vehicle 100A and other vehicles 100 in the platoon, a speed of vehicles 100 in the platoon, a lane 210 in which the platoon of vehicles 100 drive, a number of vehicles 100 in the platoon, etc.

Next, in a block 535, the computer 110 transmits a light control instruction to the caboose vehicle 100. For example, the computer 110 may be programmed to transmit an actuation instruction (i.e., a light control instruction) to deactivate the head light(s) 150A of the caboose vehicle 100D.

Next, in a block 540, the computer 110 transits light control instruction to the middle vehicle(s) 100. Fr example, the computer 110 may be programmed to deactivate the lights 150 of the middle vehicles 100B, 100C, and/or to activate side light(s) 150E of the middle vehicles 100B, 100C. Additionally or alternatively, the computer 110 may be programmed to transmit light control instructions that are determined based on road 200 curvature, distances $d_1$, $d_2$ (see FIG. 2) between the vehicles 100, etc. The computer 110 may be programmed to selectively activate lights 150 of one or more middle vehicles 100. For example, the computer 110 may be programmed to activate the side lights 150 of every other middle vehicle 100 in the platoon, one out of three vehicles 100 in the platoon, etc. Thus, advantageously, a power consumption in a platoon of vehicles 100 may be reduced.

Next, in a decision block 545, the computer 110 determines whether the vehicle 100A turn signal and/or brake is activated. For example, the computer 110 may be programmed to determine whether the turn signal and/or brake is activated based on data received from a brake pedal sensor 130, turn signal sensor 130, etc. If the computer 110 determines that the brake and/or turn signal is activated, then the process 500 proceeds to a block 550; otherwise the process 500 proceeds to a decision block 555.

In the block 550, the computer 110 transmits a light control instruction including a brake light and/or turn signal actuation instruction to the caboose vehicle. For example, the vehicle 100A computer 110 may be programmed to transmit an instruction to the caboose vehicle 100D to activate the caboose vehicle 100D brake light 150D upon determining that the brake pedal in the vehicle 100A is actuated.

In the decision block 555, the computer 110 determines whether a light 150 dimming request is received from another vehicle, e.g., the vehicle 100G. For example as shown in FIG. 3, the computer 110 may be programmed to receive a dimming request, via the wireless network 170, from the vehicle 100G driving in an opposite direction. A dimming request may include a request to reduce an intensity of and/or to change a direction of the headlight 150A. For example, the other vehicle 100G may send a dimming request to improve a vehicle 100G user vision of the road 200. If the computer 110 determines that the light dimming request is received from another vehicle 100G, then the process 500 proceeds to a block 560, otherwise the process 500 ends, or alternatively, the process 500 returns to the block 510, although not shown in FIG. 5B.

With reference to FIG. 5C, in the decision block 565, the computer 110 determines if a light control instruction is received from the lead vehicle. For example, the computer 110 may be programmed to receive, via the wireless network 170, an instruction to activate and/or deactivate a light 150 of the vehicle 100. The computer 110 may be programmed to determine whether the instruction is directed to the vehicle 100 based on a vehicle 100 identifier included in the instruction. If the computer 110 determines that the instruction for the vehicle 100 is received from the lead vehicle, e.g., the vehicle 100A, then the process 500 proceeds to a block 570; otherwise the process 500 ends, or alternatively, the process 500 returns to the block 510.

In the block 570, the computer 110 identifies one or more vehicle 100 lights 150 to actuate based on the received instruction. For example, upon receiving the light control instruction with the "low" power level, the computer 110 may identify one or more vehicle 100 lights 150 that meet the instructed power level, e.g., side lights 150E. In another example, the computer 110 may be programmed to identify the vehicle 100 brake lights 150D, turn signal 150C, etc. based on receiving the instruction to actuate the brake light 150D, the turn signal 150C, etc.

Next, in a block 575, the computer 110 actuates identified vehicle 100 lights 150. For example, the computer 110 may be programmed to actuate the brake light 150D based on the received instruction to actuate the brake lights 150D. In another example, the computer 110 may be programmed to deactivate the head lights 150A based on the received instruction.

Following the block 575, the process 500 ends, or alternatively returns to the block 510, although not shown in FIG. 5C.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer onboard a vehicle programmed to:
   identify the vehicle as a lead vehicle in a platoon of three or more vehicles;
   identify one of the vehicles in the platoon as a caboose vehicle;
   deactivate a rear light of the lead vehicle;
   provide a control instruction to activate a rear light of the caboose vehicle;
   identify a plurality of middle vehicles; and
   determine respective light control instructions for each of a plurality of middle vehicles based on a radius of a curvature of a road section from the lead vehicle to the caboose vehicle.

2. The system of claim 1, wherein the computer is further programmed to:
   identify a middle vehicle from the vehicles in the platoon; and
   deactivate a head light and a tail light of the middle vehicle.

3. The system of claim 2, wherein the computer is further programmed to deactivate a brake light and a turn signal of the middle vehicle.

4. The system of claim 2, further comprising a computer of the middle vehicle programmed to:
   receive an instruction from the lead vehicle;
   identify one or more lights of the middle vehicle based on the received instruction; and
   actuate the identified one or more lights of the middle vehicle.

5. The system of claim 1, wherein the computer is further programmed to actuate a head light of the lead vehicle to turn off upon determining that the lead vehicle is stopped at an intersection and a dimming request is received from a second vehicle.

6. The system of claim 1, wherein the computer is further programmed to transmit at least one of a number of the platoon of three or more vehicles and a distance between the lead vehicle and the caboose vehicle, to a second vehicle approaching the lead vehicle in an opposite direction.

7. The system of claim 1, wherein the computer is further programmed to deactivate a head light of the caboose vehicle.

8. The system of claim 1, wherein the computer is further programmed to instruct activation of the rear light of the caboose vehicle by actuating at least one of a turn signal and a brake light of the caboose vehicle based on data received from the lead vehicle.

9. The system of claim 1, wherein the computer is further programmed to:
   identify a plurality of middle vehicles; and
   determine respective light control instructions for each of the plurality of middle vehicles based on a curvature of a road section from the lead vehicle to the caboose vehicle.

10. The system of claim 9, wherein the computer is further programmed to determine the respective light instruction for each of the plurality of middle vehicles based on a distance of the respective middle vehicle to at least one of a next front vehicle and a next rear vehicle in the same lane.

11. The system of claim 9, wherein the vehicles of the platoon are in a first lane and a second vehicle is in a second lane, and the computer is further programmed to determine the light control instruction for each of the middle vehicles based on a distance of the respective middle vehicle to the second vehicle.

* * * * *